United States Patent
Jose et al.

(10) Patent No.: US 8,971,906 B2
(45) Date of Patent: Mar. 3, 2015

(54) HYBRID INTERFERENCE ALIGNMENT FOR MIXED MACRO-FEMTO BASE STATION DOWNLINK

(71) Applicant: QUALCOMM Incorporated, San Diego, CA (US)

(72) Inventors: Jubin Jose, Bound Brook, NJ (US); Sundar Subramanian, Bridgewater, NJ (US); Xinzhou Wu, Hillsborough, NJ (US); Junyi Li, Chester, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 13/744,109

(22) Filed: Jan. 17, 2013

(65) Prior Publication Data

US 2014/0200010 A1    Jul. 17, 2014

(51) Int. Cl.
*H04W 72/00*  (2009.01)
*H04W 72/08*  (2009.01)
*H04B 7/04*   (2006.01)

(52) U.S. Cl.
CPC .......... *H04W 72/082* (2013.01); *H04B 7/0413* (2013.01); *H04B 7/0452* (2013.01)
USPC ....................................................... 455/450

(58) Field of Classification Search
USPC ....................................................... 455/450
See application file for complete search history.

(56) References Cited

U.S. PATENT DOCUMENTS

| | | | |
|---|---|---|---|
| 7,729,432 B2 | 6/2010 | Khan et al. |
| 7,768,984 B2 | 8/2010 | Lee et al. |
| 7,787,546 B2 | 8/2010 | Khan |
| 8,036,098 B2 | 10/2011 | Pereira et al. |
| 2004/0146003 A1 | 7/2004 | Schaefer et al. |
| 2007/0082619 A1 | 4/2007 | Zhang et al. |
| 2008/0285477 A1 | 11/2008 | Kuroda et al. |
| 2009/0052566 A1 | 2/2009 | Maltsev et al. |
| 2009/0247086 A1 | 10/2009 | Lin et al. |
| 2010/0226293 A1 | 9/2010 | Kim et al. |
| 2010/0227613 A1 | 9/2010 | Kim et al. |

(Continued)

FOREIGN PATENT DOCUMENTS

KR    2012034973 A    4/2012

OTHER PUBLICATIONS

Larsson P, et al., "Multiuser diversity forwarding in multihop packet radio networks" IEEE Wireless Communications and Networking Conference, vol. 4, Mar. 13, 2005', pp. 2188-2194, XP010791518 IEEE, Piscataway, NJ, USA 001: 10.1109/WCNC. 2005.

(Continued)

*Primary Examiner* — Joel Ajayi
(74) *Attorney, Agent, or Firm* — Arent Fox LLP

(57) ABSTRACT

A method, an apparatus, and a computer program product for wireless communication are provided. The apparatus is a first BS. The apparatus determines a first channel between a second BS and a first UE served by a third BS, determines a second channel between the first base station and the first UE, and determines a first direction vector to be used by the second base station for sending a data transmission. The apparatus transmits a set of resource blocks to a second UE served by the first base station with a second direction vector determined based on the first channel, the second channel, and the first direction vector to be used by the second base station.

36 Claims, 14 Drawing Sheets

(56) References Cited

U.S. PATENT DOCUMENTS

| | | |
|---|---|---|
| 2010/0227635 A1 | 9/2010 | Kim et al. |
| 2010/0227637 A1 | 9/2010 | Kwon et al. |
| 2010/0246515 A1 | 9/2010 | Tsai et al. |
| 2010/0248712 A1 | 9/2010 | Lee et al. |
| 2010/0291938 A1 | 11/2010 | Jang |
| 2011/0002406 A1 | 1/2011 | Ming et al. |
| 2011/0059765 A1 | 3/2011 | Kim et al. |
| 2011/0090882 A1 | 4/2011 | Lee et al. |
| 2011/0141926 A1 | 6/2011 | Damnjanovic et al. |
| 2011/0177834 A1 | 7/2011 | Shin et al. |
| 2011/0305286 A1 | 12/2011 | Shimezawa et al. |
| 2012/0040706 A1 | 2/2012 | Shin et al. |
| 2012/0062421 A1 | 3/2012 | Su et al. |
| 2012/0077485 A1 | 3/2012 | Shin et al. |
| 2012/0077511 A1 | 3/2012 | Shin et al. |
| 2012/0122502 A1 | 5/2012 | Shin et al. |
| 2012/0170442 A1 | 7/2012 | Razaviyayn et al. |
| 2012/0178482 A1 | 7/2012 | Seo et al. |
| 2012/0269077 A1 | 10/2012 | Bazzi et al. |
| 2012/0281780 A1 | 11/2012 | Huang et al. |
| 2012/0307929 A1 | 12/2012 | Seo et al. |
| 2013/0157705 A1 | 6/2013 | Kwon et al. |
| 2013/0344908 A1 | 12/2013 | Hwang |
| 2014/0094164 A1 | 4/2014 | Hwang et al. |
| 2014/0105120 A1 | 4/2014 | Jose et al. |
| 2014/0105121 A1 | 4/2014 | Jose et al. |
| 2014/0204773 A1 | 7/2014 | Jose et al. |

OTHER PUBLICATIONS

Jung, et al., "Opportunistic Interference Mitigation Achieves Optimal Degrees-of-Freedom in Wireless Multi-Cell Uplink Networks", IEEE Transactions on Communications, vol. 60, No. 7, Jul. 2012, 10pgs.

Khan, et al., "Interference-Driven Linear Precoding in Multiuser MISO Downlink Cognitive Radio Network", Vehicular Technology, IEEE Transactions, vol. 61, Issue: 6, Jul. 2012, pp. 2531-2543.

Tang, et al., "Opportunistic MIMO Multi-Cell Interference Alignment Techniques", Internet Multimedia Systems Architecture and Application (IMSAA), 2011 IEEE 5th International Conference, Dec. 2011, 4 pgs.

International Search Report and Written Opinion—PCT/US2014/011327—ISA/EPO—May 27, 2014.

Jung B.C., et al., "Opportunistic Interference Alignment for Interference—Limited Cellular TDD Uplink", IEEE Communications Letters, IEEE Service Center, Piscataway, MJ, US, vol. 15, No. 2, Feb. 1, 2011, pp. 148-150, XP011345749, ISSN: 1089-7798, DOI: 10.1109/LCOMM .2011.1213 10.101439 p. 148, right-hand column, line 13-line 17 p. 149, left-hand column, line 8-line 10, III, OIA in cellular networks.

HYBRID INTERFERENCE ALIGNMENT FOR MIXED MACRO-FEMTO BASE STATION DOWNLINK

BACKGROUND

1. Field

The present disclosure relates generally to communication systems, and more particularly, to hybrid interference alignment for mixed macro-femto base station downlink.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus is a first base station. The apparatus determines a first channel between a second base station and a first user equipment served by a third base station. The apparatus determines a second channel between the first base station and the first UE. The apparatus determines a first direction vector to be used by the second base station for sending a data transmission. The apparatus transmits a set of resource blocks to a second UE served by the first base station with a second direction vector determined based on the first channel, the second channel, and the first direction vector to be used by the second base station.

DETAILED DESCRIPTION

Figure 1:
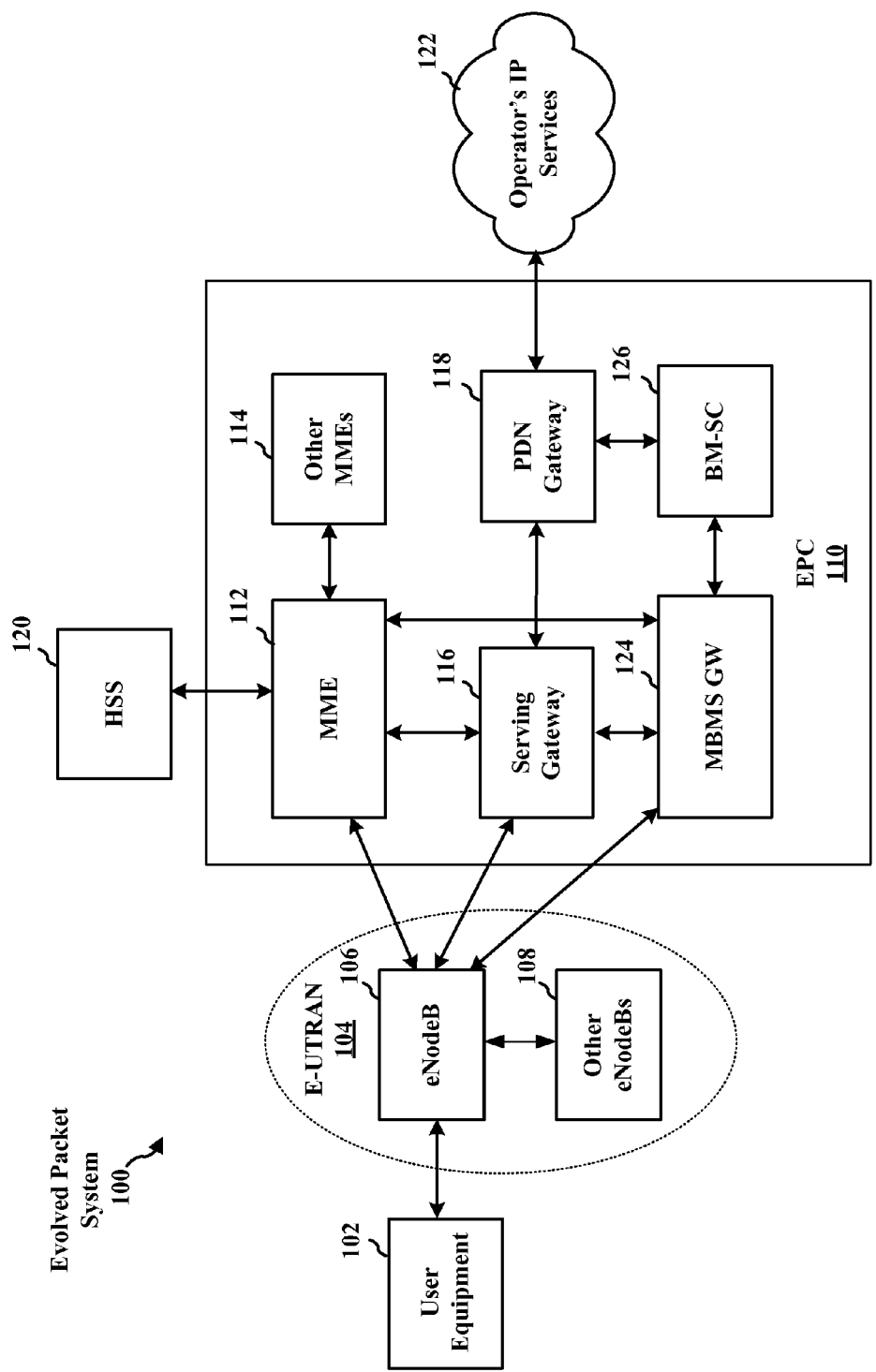
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station (BS), a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to an MBSFN area broadcasting a particular service, and may be responsible for session management (start/stop) and for collecting eMBMS related charging information.

Figure 2:
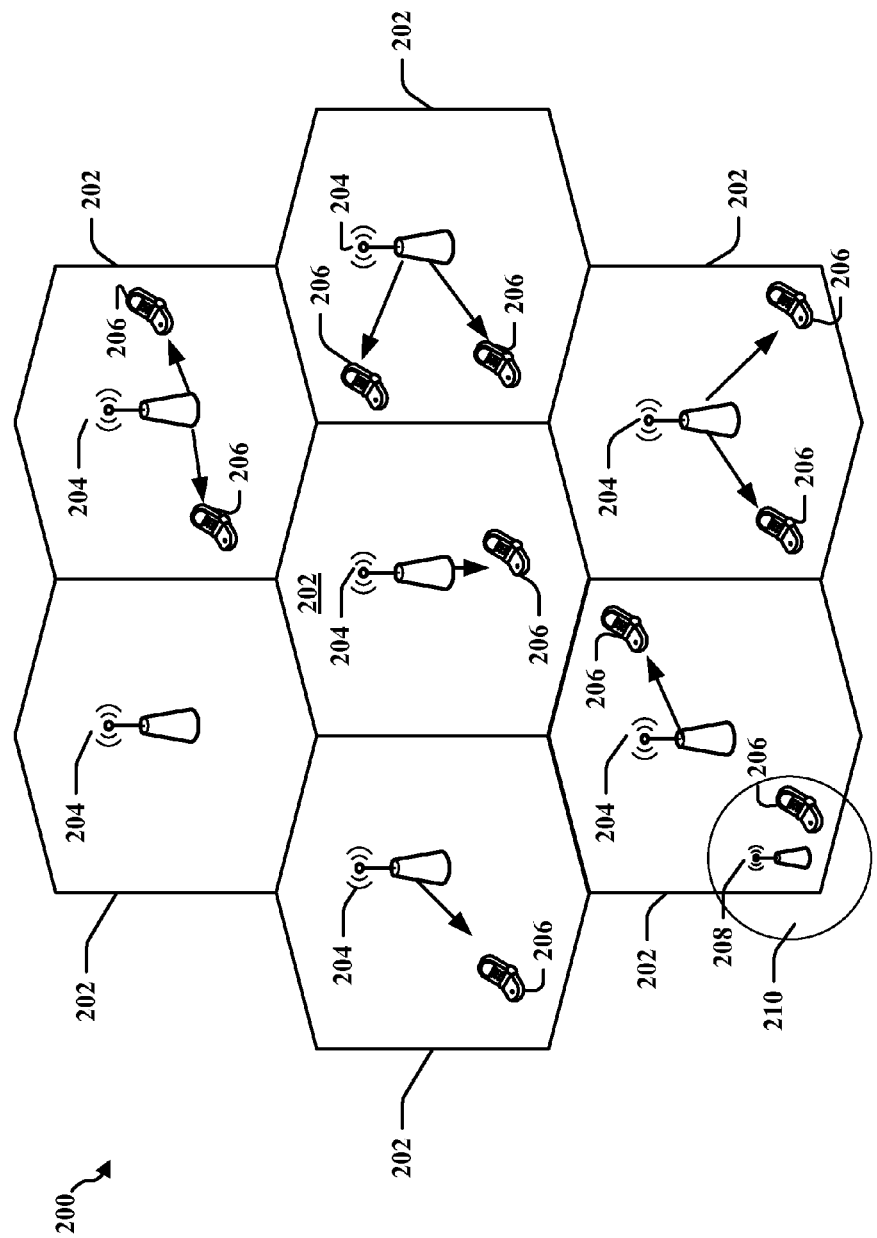
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
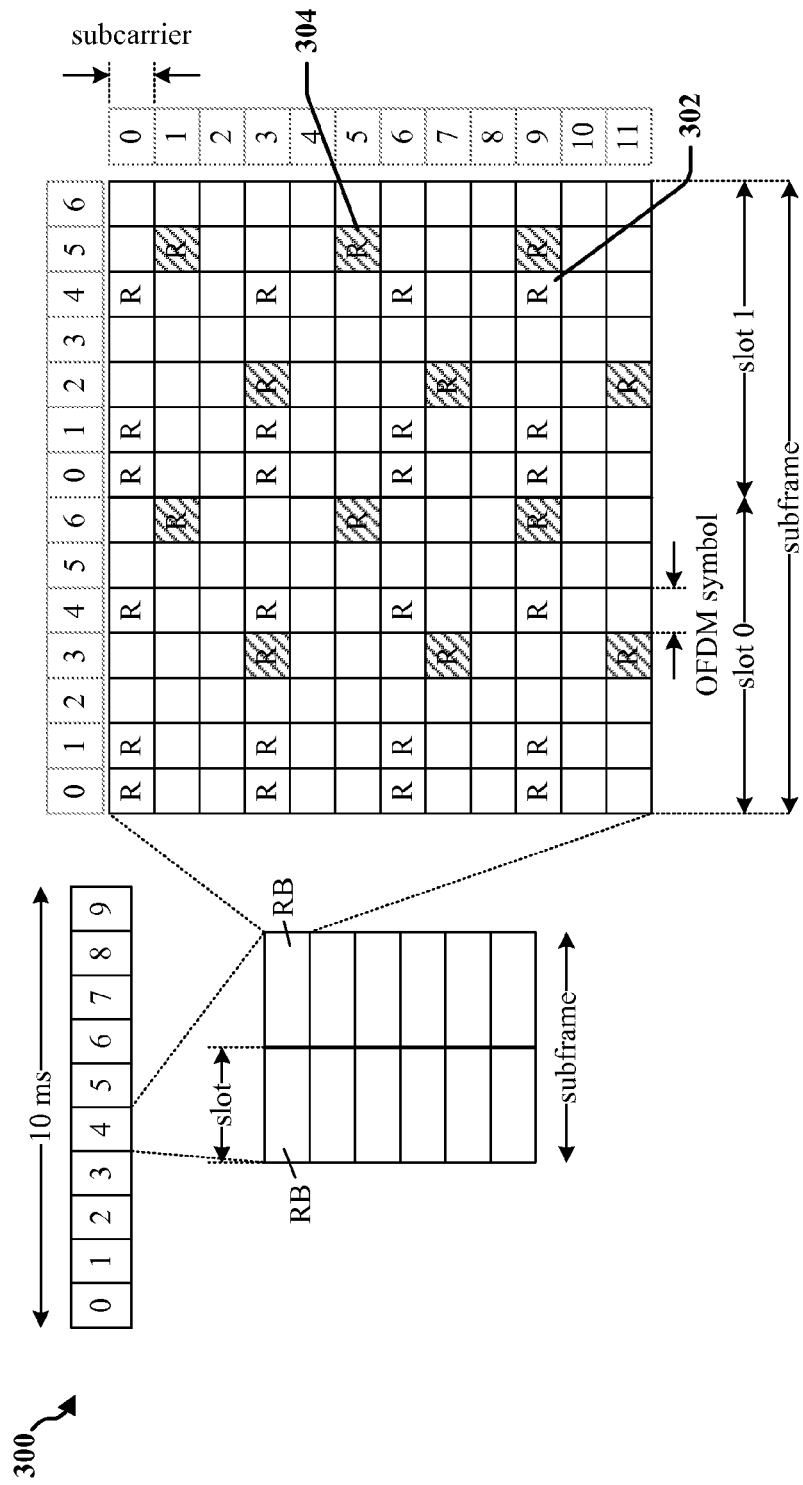
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
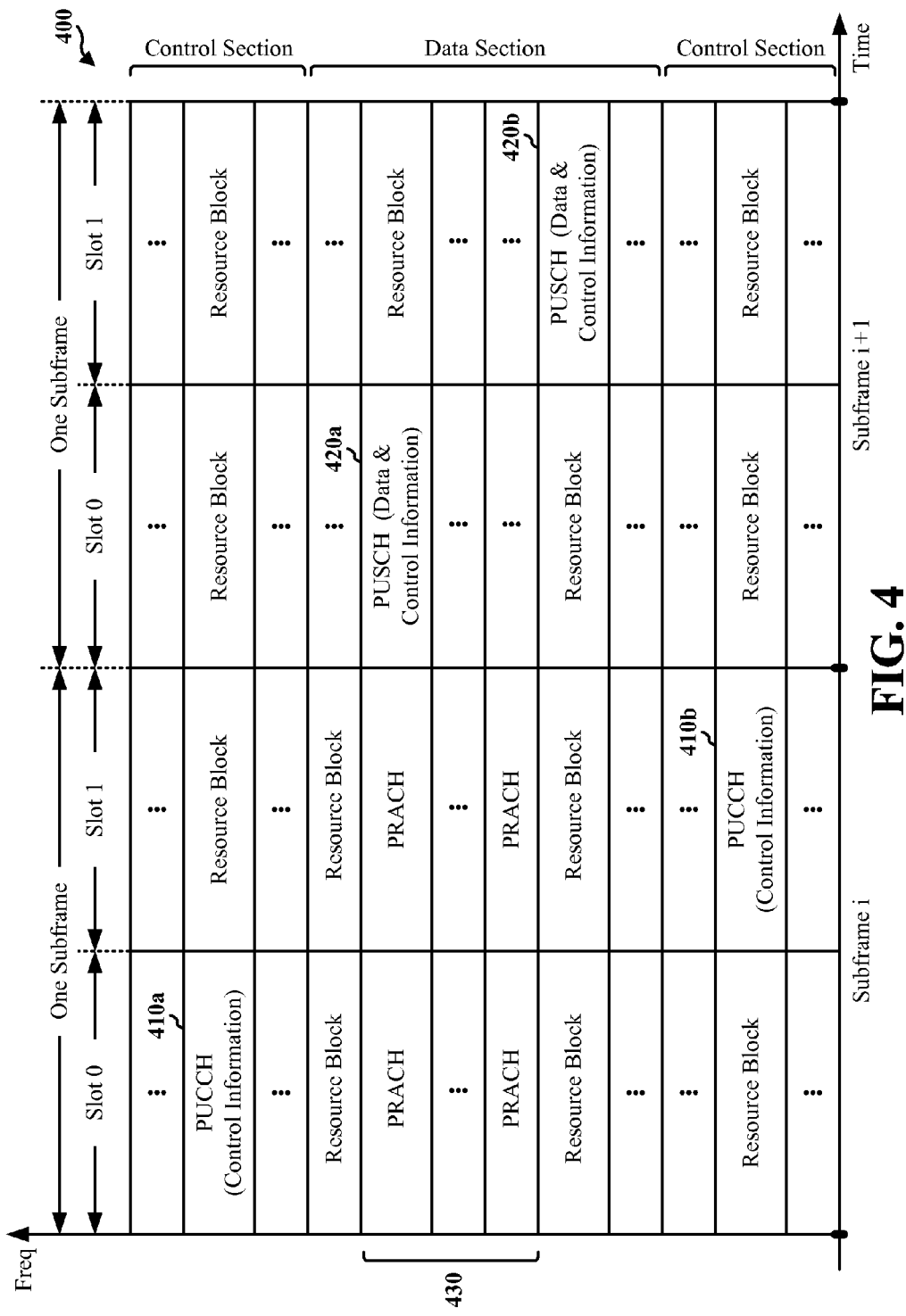
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
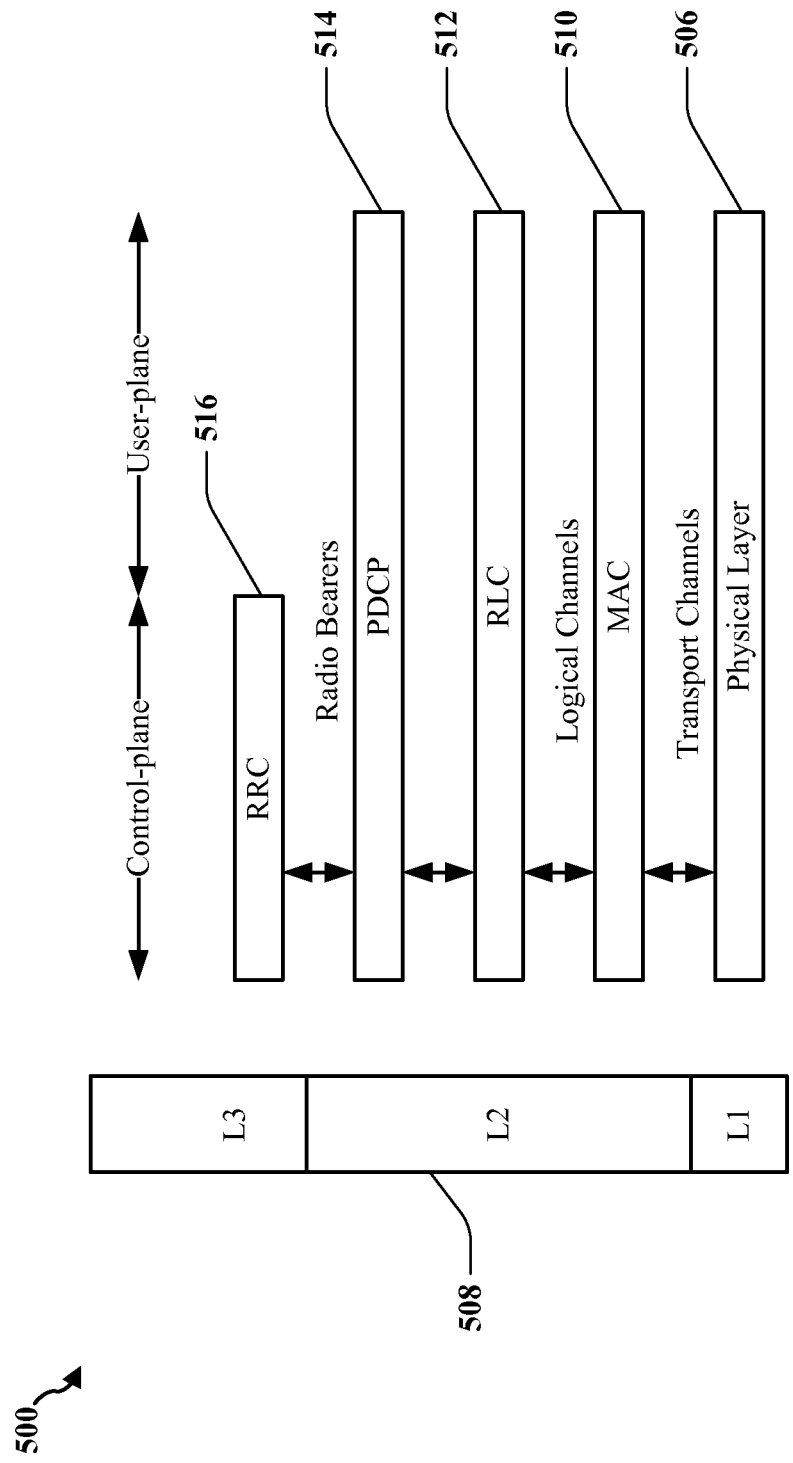
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
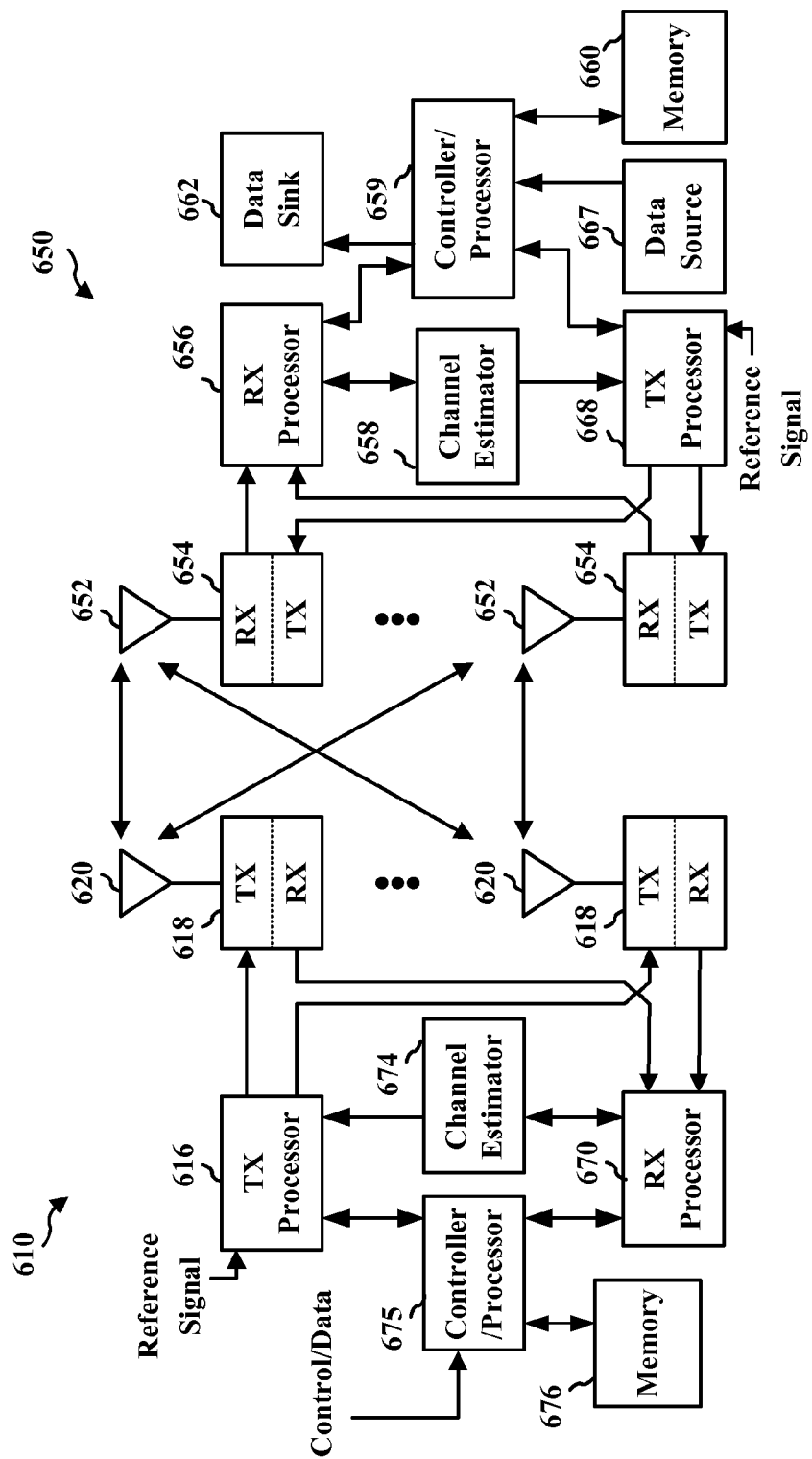
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Interference alignment schemes have been developed to mitigate interference. Interference alignment schemes include deterministic interference alignment schemes and opportunistic interference alignment schemes. The conditions for deterministic interference alignment schemes can be difficult to solve. The conditions for opportunistic interference alignment schemes can be less difficult to solve by a base station by taking advantage of many UEs being served by the base station. However, the gain from opportunistic interference alignment schemes can be poor if all of the base stations do not have many UEs. An important scenario is that of a plurality of neighboring femto base stations within the coverage area of a macro base station. Typically, femto base stations have one UE, while macro base stations have many UEs. There is currently a need for a hybrid interference alignment scheme that includes deterministic and opportunistic components that can provide good interference mitigation for the femto/macro base station scenario.

Figure 7:
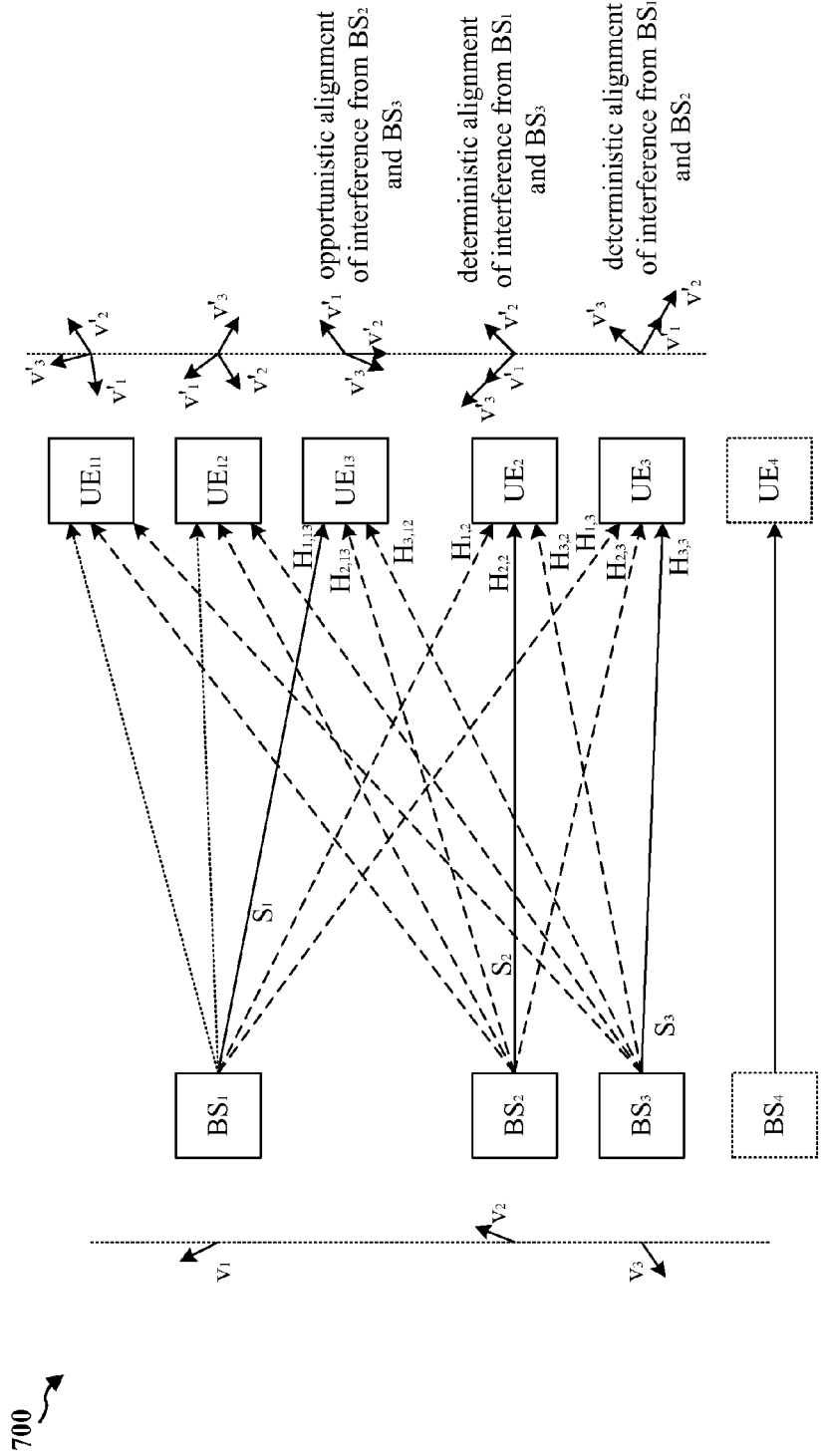
FIG. 7 is a first diagram for illustrating exemplary methods.

FIG. 7 is a first diagram 700 for illustrating exemplary methods. As shown in FIG. 7, a macro base station $BS_1$ is serving $UE_{11}$, $UE_{12}$, and $UE_{13}$, a femto base station $BS_2$ is serving $UE_2$, a femto base station $BS_3$ is serving $UE_3$, and a femto base station $BS_4$ is serving $UE_4$. The $BS_1$ applies an opportunistic interference alignment scheme to select one of the UEs $UE_{11}$, $UE_{12}$, or $UE_{13}$ that will benefit the most from the scheme in a particular subframe/slot, and applies a pseudo-random and orthogonal direction vector $v_1(t)$ to data before or when transmitting the data $S_1$ to the selected UE in the particular subframe/slot. As shown in FIG. 7, the $BS_1$ selects the $UE_{13}$ for the data transmission. The direction vector $v_1(t)$ has M dimensions greater than or equal to two. The M dimensions may be antenna dimensions (MIMO) and/or frequency dimensions (e.g., resource blocks in OFDM). Each dimension may modify modulated data symbols in amplitude and/or phase.

The $BS_2$ applies a deterministic interference alignment scheme and determines an orthogonal direction vector $v_2(t)$, applies the direction vector $v_2(t)$ to data, and transmits the data $S_2$ to the $UE_2$ in the particular subframe/slot. The direction vector $v_2(t)$ has M dimensions greater than or equal to two. The M dimensions may be antenna dimensions (MIMO) and/or frequency dimensions (e.g., resource blocks in OFDM). Each dimension may modify modulated data symbols in amplitude and/or phase. The direction vector $v_2(t)$ is determined as follows:

$$v_2(t) \propto v_1(t) H_{1,3}(H_{2,3})^{-1}, \quad (1)$$

where $H_{1,3}$ is the channel between $BS_1$ and $UE_3$ and $H_{2,3}$ is the channel between $BS_2$ and $UE_3$. Similarly, the $BS_3$ applies a deterministic interference alignment scheme and determines an orthogonal direction vector $v_3(t)$, applies the direction vector $v_3(t)$ to data, and transmits the data $S_3$ to the $UE_3$ in the particular subframe/slot. The direction vector $v_3(t)$ has M dimensions greater than or equal to two. The M dimensions may be antenna dimensions (MIMO) and/or frequency dimensions (e.g., resource blocks in OFDM). Each dimension may modify modulated data symbols in amplitude and/or phase. The direction vector $v_3(t)$ is determined as follows:

$$v_3(t) \propto v_1(t) H_{1,2}(H_{3,2})^{-1}, \quad (2)$$

where $H_{1,2}$ is the channel between $BS_1$ and $UE_2$ and $H_{3,2}$ is the channel between $BS_3$ and $UE_2$.

In FIG. 7, the transmitted direction vectors are represented as $v_i(t)$ and the received direction vectors are represented as $v'_i(t)$. While a received direction vector is labeled $v'_i(t)$ for i=1, 2, and 3 for each of the UEs in FIG. 7, the received direction vector $v'_i(t)$ for i=1, 2, and 3 for each of the UEs may differ in amplitude and/or phase due to the channel between the transmitting base station and the UE. As such, for example, while the received direction vector $v'_1(t)$ at the $UE_2$ and the received direction vector $v'_1(t)$ at the $UE_3$ are labeled the same, the direction vectors $v'_1(t)$ for each of the $UE_2$ and $UE_3$ are different as shown by the different phase directions of the arrows in FIG. 7.

As shown in FIG. 7, the $UE_{13}$ receives the data transmission $S_1$ with the applied direction vector $v_1(t)$ from the $BS_1$. The data transmission $S_1$ is modified by the channel $H_{1,13}$ between the $BS_1$ and the $UE_{13}$ and is received with a direction vector $v'_1(t)$ due to the channel $H_{1,13}$. The $UE_{13}$ also receives the interfering data transmission $S_2$ from the $BS_2$ and the interfering data transmission $S_3$ from the $BS_3$. The interfering data transmission $S_2$ is modified by the channel $H_{2,13}$ between the $BS_2$ and the $UE_{13}$ and is received with a direction vector $v'_2(t)$ due to the channel $H_{2,13}$. The interfering data transmission $S_3$ is modified by the channel $H_{3,13}$ between the $BS_3$ and the $UE_{13}$ and is received with a direction vector $v'_3(t)$ due to the channel $H_{3,13}$. The received direction vectors $v'_2(t)$ and $v'_3(t)$ are shown aligning (i.e., proportional) or nearly aligning (i.e., nearly proportional), as the $BS_1$ previously selected the $UE_{13}$ for the data transmission because of the opportunistic interference alignment.

The $UE_2$ receives the data transmission $S_2$ with the applied direction vector $v_2(t)$ from the $BS_2$. The data transmission $S_2$ is modified by the channel $H_{2,2}$ between the $BS_2$ and the $UE_2$ and is received with a direction vector $v'_2(t)$ due to the channel $H_{2,2}$. The $UE_2$ also receives the interfering data transmission $S_1$ from the $BS_1$ and the interfering data transmission $S_3$ from the $BS_3$. The interfering data transmission $S_1$ is modified by the channel $H_{1,2}$ between the $BS_1$ and the $UE_2$ and is received with a direction vector $v'_1(t)$ due to the channel $H_{1,2}$. The interfering data transmission $S_3$ is modified by the channel $H_{3,2}$ between the $BS_3$ and the $UE_2$ and is received with a direction vector $v'_3(t)$ due to the channel $H_{3,2}$. The received direction vectors $v'_1(t)$ and $v'_3(t)$ align (i.e., proportional) or nearly align (i.e., nearly proportional) due to the application of the direction vector $v_3(t)$ by the $BS_3$.

The $UE_3$ receives the data transmission $S_3$ with the applied direction vector $v_3(t)$ from the $BS_3$. The data transmission $S_3$ is modified by the channel $H_{3,3}$ between the $BS_3$ and the $UE_3$ and is received with a direction vector $v'_3(t)$ due to the channel $H_{3,3}$. The $UE_3$ also receives the interfering data transmission $S_1$ from the $BS_1$ and the interfering data transmission $S_2$ from the $BS_2$. The interfering data transmission $S_1$ is modified by the channel $H_{1,3}$ between the $BS_1$ and the $UE_3$ and is received with a direction vector $v'_1(t)$ due to the channel $H_{1,3}$. The interfering data transmission $S_2$ is modified by the channel $H_{2,3}$ between the $BS_2$ and the $UE_3$ and is received with a direction vector $v'_2(t)$ due to the channel $H_{2,3}$. The received direction vectors $v'_1(t)$ and $v'_2(t)$ align (i.e., proportional) or nearly align (i.e., nearly proportional) due to the application of the direction vector $v_2(t)$ by the $BS_2$.

When the interfering signals are received with direction vectors that align or nearly align, the UE can more easily cancel the interfering signals from the signal received from the serving base station. Generally, a femto base station $BS_i$ determines a direction vector $v_i(t)$ to apply to transmitted data as follows:

$$v_i(t) \propto v_1(t) A_i, \quad (3)$$

where $v_1(t)$ is the pseudo-random and orthogonal direction vector applied by the macro base station and $A_i$ is a rotation matrix computed by the femto base station $BS_i$. The rotation matrix $A_i$ may be determined based on channels between the macro base station and a UE served by a neighboring femto base station and between itself and the UE served by the neighboring femto base station. In the example provided in FIG. 7, the $BS_2$ determines the rotation matrix $A_2$ as $A_2 = H_{1,3}(H_{2,3})^{-1}$ and the $BS_3$ determines the rotation matrix $A_3$ as $A_3 = H_{1,2}(H_{3,2})^{-1}$.

Figure 8:
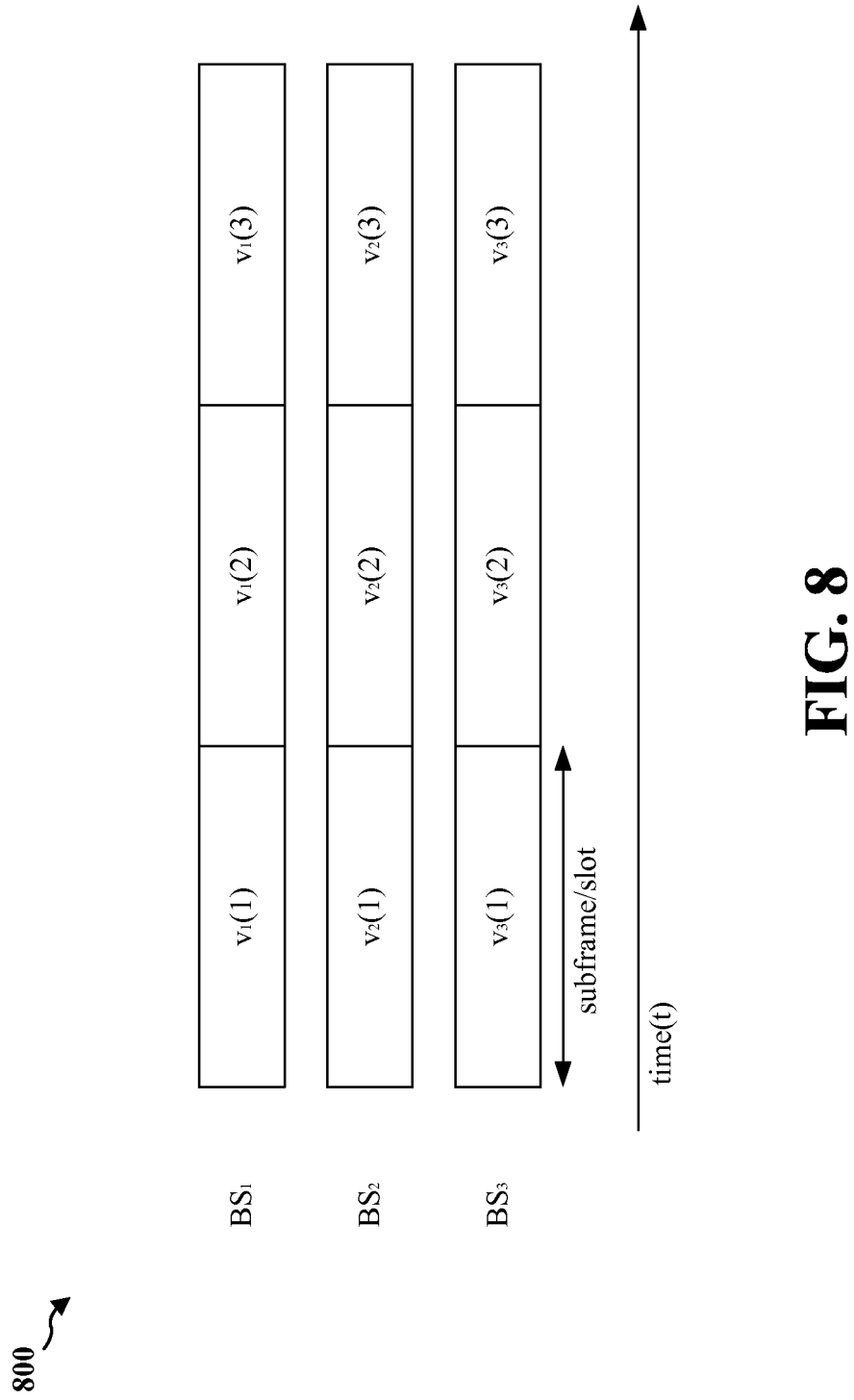
FIG. 8 is a second diagram for illustrating exemplary methods.

FIG. 8 is a second diagram 800 for illustrating exemplary methods. As shown in FIG. 8, each of the base stations $BS_1$, $BS_2$, $BS_3$ may synchronously change the direction vectors each subframe/slot. The director vectors used by the macro base station $BS_1$ may be predetermined and known a priori by the macro base station $BS_1$ and each of the femto base stations $BS_2$ and $BS_3$. The direction vector $v_1(t)$ may be based on different pseudo-random sequences or seeds and may hop around to different values. The direction vector $v_1(t)$ may be dependent on an identifier of the $BS_1$, subcarriers of the utilized resource blocks, or a corresponding subframe and/or system frame number. When the direction vector $v_1(t)$ depends on the subframe and/or on a system frame number, the direction vector $v_1(t)$ may be said to be time-varying. As discussed supra, the femto base stations $BS_2$ and $BS_3$ determine the direction vectors $v_2(t)$ and $v_3(t)$, respectively, to apply to data for transmission. As such, the femto base stations $BS_2$ and $BS_3$ determine their direction vectors $v_2(t)$ and $v_3(t)$, respectively, based on $v_1(t)$.

Figure 9:
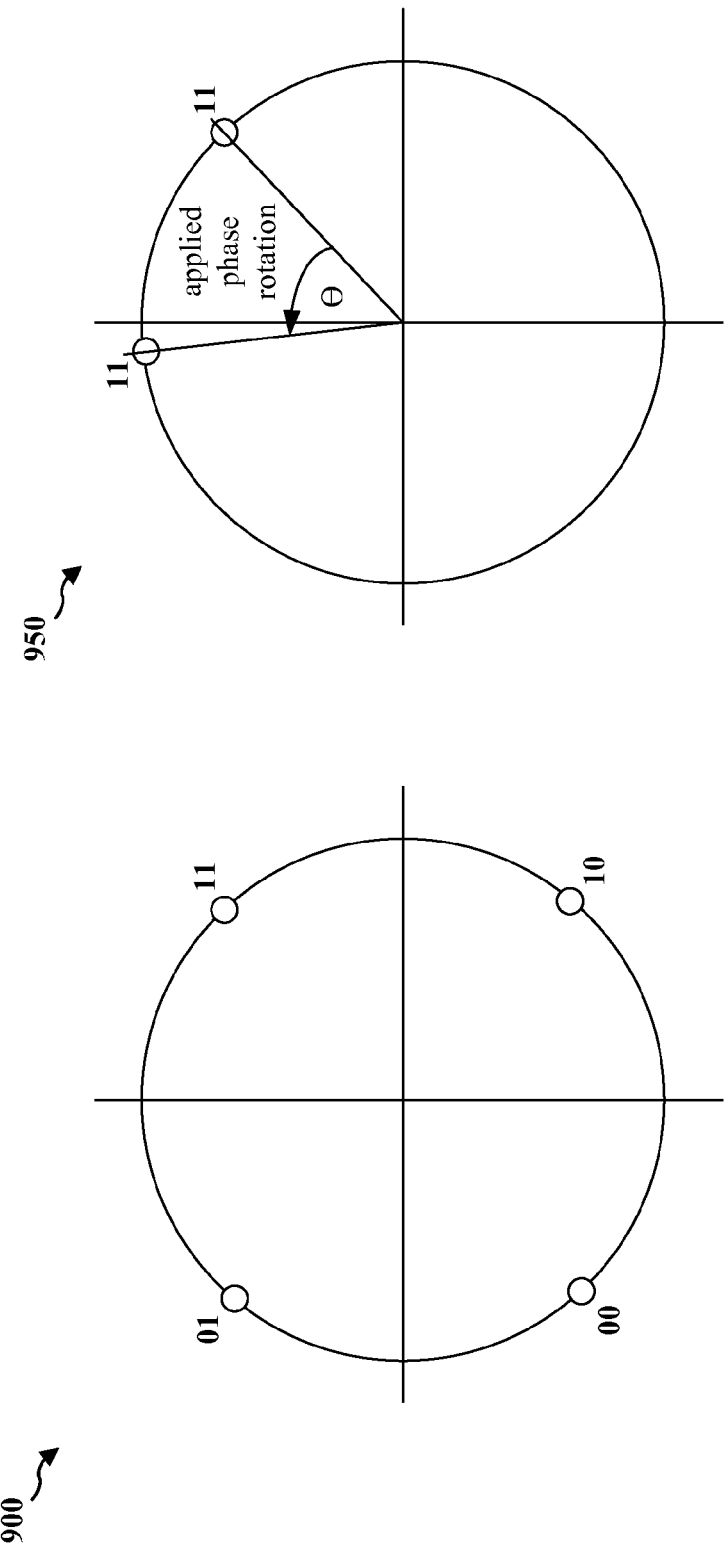
FIG. 9 is a third diagram for illustrating exemplary methods.

FIG. 9 is a third diagram 900 for illustrating exemplary methods. FIG. 9 specifically illustrates the phase rotation of a modulated data symbol. As discussed supra, the $BS_1$, $BS_2$, and $BS_3$ apply direction vectors to modulated data symbols before transmitting (frequency dimensions) the modulated data symbols or when transmitting (antenna dimensions) the modulated data symbols. The direction vectors modify an amplitude and/or a phase of the modulated data symbols. Assume that the number of dimensions is two (i.e., M=2). Accordingly, with respect to the femto base station $BS_2$, $v_2(t)=[v_{2,1}(t)\ v_{2,2}(t)]$, where $v_{2,1}(t)=A_1 e^{j\theta_1}$ and $v_{2,2}(t)=A_2 e^{j\theta_2}$. Assume also that the direction vector $v_2(t)$ modifies the modulated data symbols in phase only (i.e., $A_1=1$ and $A_2=1$). Further, assume the femto base station $BS_2$ modulates the data using QPSK. The diagram 900 illustrates possible QPSK values. As shown in the diagram 950, if the $BS_2$ applies a phase rotation to the QPSK value 11, the $BS_2$ may rotate a phase of the modulated symbol by θ. The value θ is a function of a phase applied by the macro base station $BS_1$ (as discussed in relation to equations (1) and (3)). In a frequency dimension configuration, the $BS_2$ duplicates the data by mapping the same data to both a first set of resource blocks/elements and a second set of resource blocks/elements. The $BS_2$ applies a first phase rotation $\theta_1$ to modulated data symbols in the first set of resource blocks/elements and a second phase rotation $\theta_2$ to modulated data symbols in the second set of resource blocks/elements. In an antenna dimension configuration, the $BS_2$ duplicates the modulated data symbols not through a mapping of modulated data symbols onto resource blocks/elements, but through the transmission of the same modulated data symbols through a plurality of transmit antennas. A first set of transmit antennas applies a first phase rotation $\theta_1$ to the modulated data symbols and a second set of transmit antennas applies a second phase rotation $\theta_2$ to the modulated data symbols.

Figures 10A, 10B:
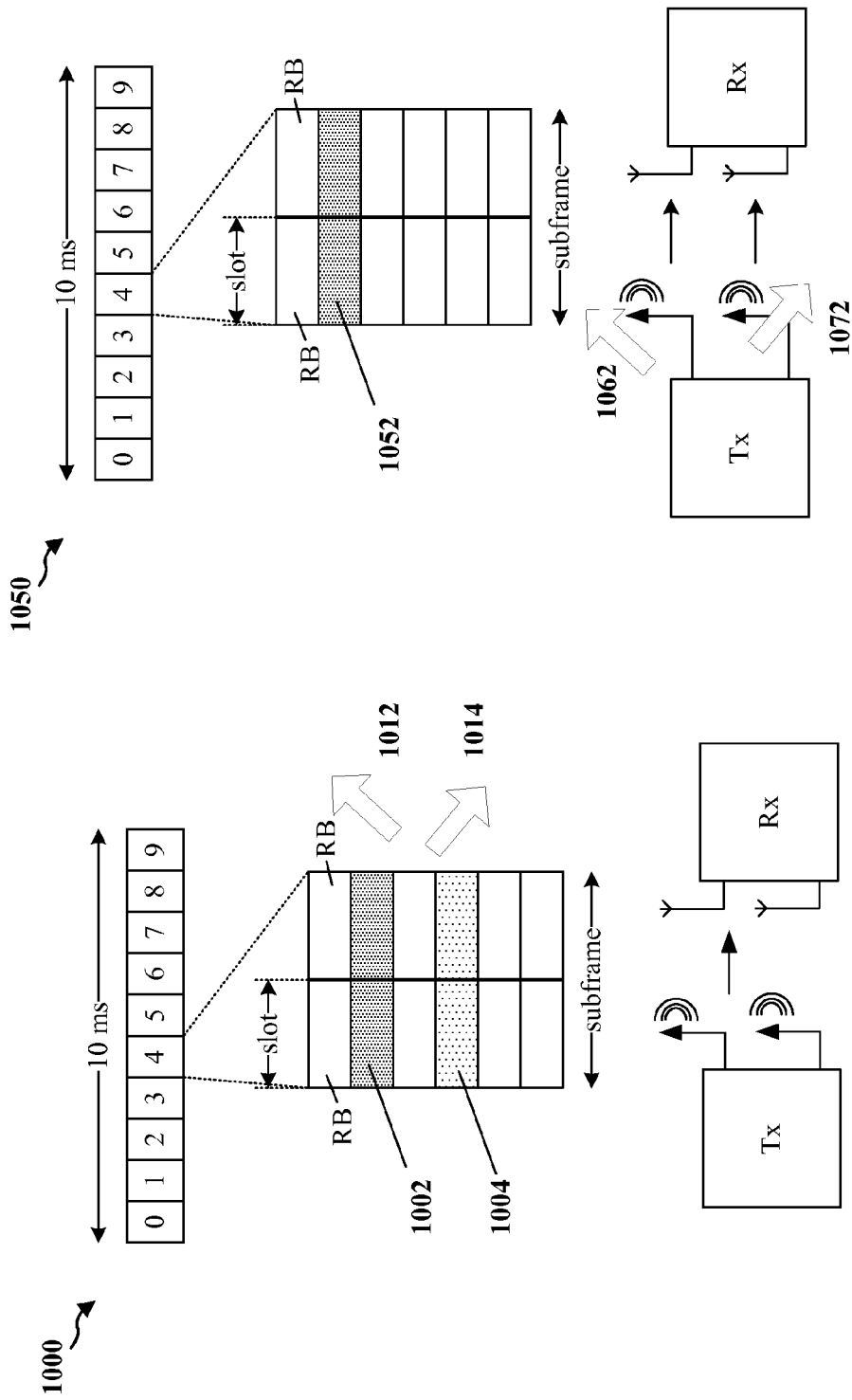
FIG. 10A is a fourth diagram for illustrating exemplary methods.
FIG. 10B is a fifth diagram for illustrating exemplary methods.

FIG. 10A is a fourth diagram 1000 for illustrating exemplary methods. When applying frequency dimensions, the base stations $BS_1$, $BS_2$, and $BS_3$ map the same modulated data symbols to both a first set of resource blocks/elements and to a second set of resource blocks/elements. For FIG. 10A, assume that the base stations $BS_1$, $BS_2$, and $BS_3$ map the same modulated data symbols to different sets of resource blocks (i.e., the granularity is resource blocks and not resource elements). Accordingly, a base station may map the same modulated data symbols to a first set of resource blocks 1002 and to a second set of resource blocks 1004. The base station applies the direction vector v(t) to the modulated data symbols in the first set of resource blocks 1002 and the second set of resource blocks 1004, which results in the modulated data symbols in the first set of resource blocks and the second set of resource blocks being modified in amplitude and/or phase as shown by the arrows 1012, 1014.

FIG. 10B is a fifth diagram 1050 for illustrating exemplary methods. When applying antenna dimensions, the base stations $BS_1$, $BS_2$, and $BS_3$ map modulated data symbols to a set of resource blocks/elements and transmit the same set of resource blocks/elements using a different set of transmit antennas to apply the direction vector v(t) on the modulated data symbols. Accordingly, a base station may map modulated data symbols to a set of resource blocks 1052 and transmit the set of resource blocks 1052 through different transmit antennas so as to modify an amplitude and/or a phase of the modulated data symbols as shown by the arrows 1062, 1072.

Figure 11:
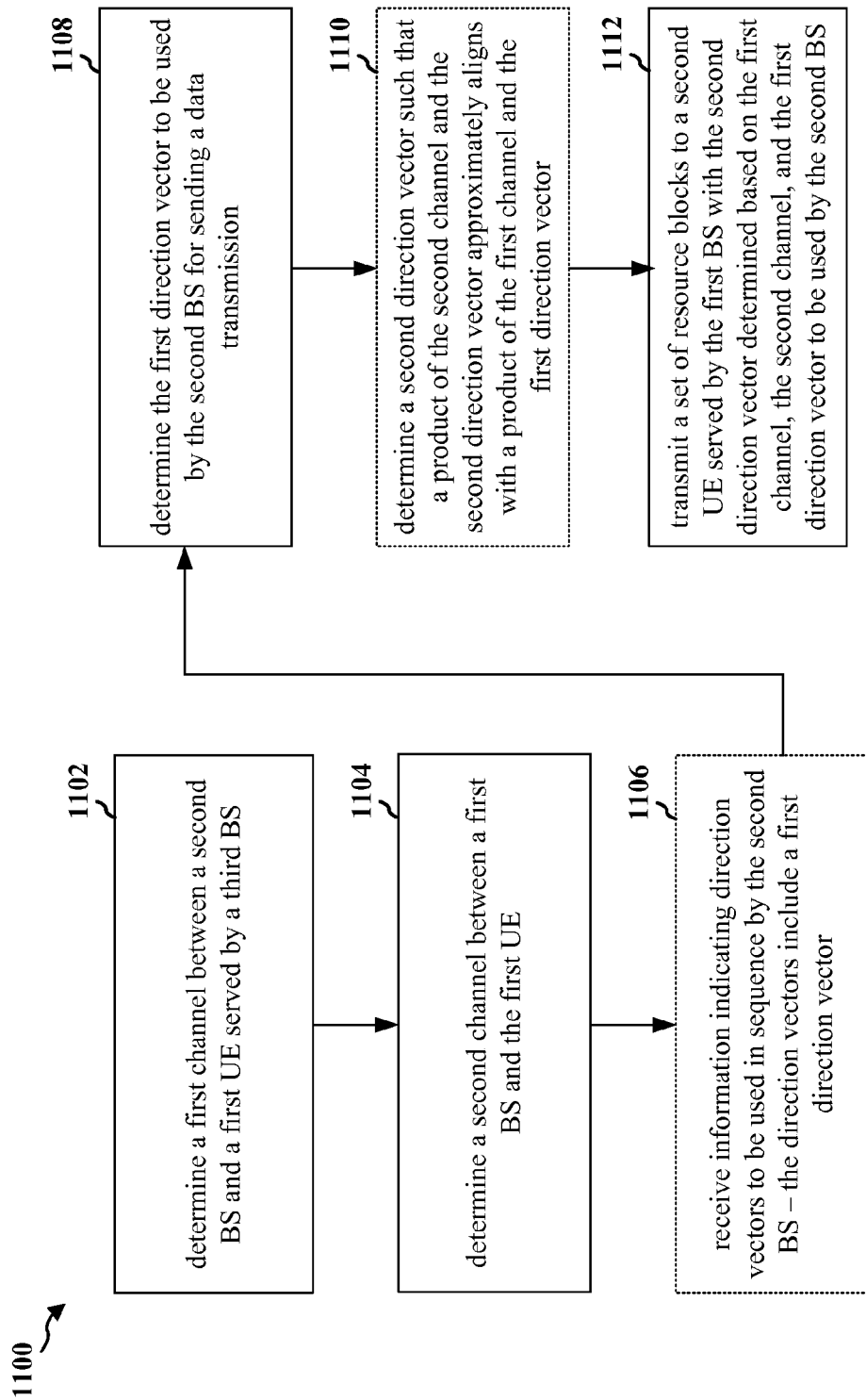
FIG. 11 is a flow chart of a first method of wireless communication.

FIG. 11 is a flow chart 1100 of a first method of wireless communication. The method may be performed by a base station, such as the femto base station $BS_2$ or the femto base station $BS_3$. As shown in FIG. 11, in step 1102 a first BS determines a first channel between a second BS and a first UE served by a third BS. In step 1104, the first BS determines a second channel between the first BS and the first UE. In step 1108, the first BS determines a first direction vector to be used by the second BS for sending a data transmission. In step 1112, the first BS transmits a set of resource blocks (using frequency dimensions and/or antenna dimensions) to a second UE served by the first BS with a second direction vector determined based on the first channel, the second channel, and the first direction vector to be used by the second BS. In step 1106, the first BS may receive information indicating direction vectors to be used in sequence by the second BS. The information indicating direction vectors may include information indicating the first direction vector determined in step 1108. In step 1110, the first BS may determine the second direction vector such that a product of the second channel and the second direction vector approximately aligns with (i.e., is proportional to) a product of the first channel and the first direction vector.

For example, referring to FIG. 7, the $BS_2$ determines a first channel $H_{1,3}$ between the $BS_1$ and the $UE_3$ served by the $BS_3$. The $BS_2$ determines a second channel $H_{2,3}$ between the $BS_2$ and the $UE_3$. The $BS_2$ determines a first direction vector $v_1(t)$ to be used by the $BS_1$ for sending a data transmission. The $BS_2$ transmits a set of resource blocks to a $UE_2$ served by the $BS_2$ with a second direction vector $v_2(t)$ determined based on the first channel $H_{1,3}$, the second channel $H_{2,3}$, and the first direction vector $v_1(t)$ to be used by the $BS_1$. As discussed in relation to FIG. 8, the $BS_2$ may receive information indicating direction vectors $v_1(t)$ to be used in sequence by the $BS_1$. As discussed in relation to Eq. (1), the $BS_2$ may determine the second direction vector $v_2(t)$ such that a product of the second channel $H_{2,3}$ and the second direction vector $v_2(t)$ approximately aligns with (i.e., is proportional to) a product of the first channel $H_{1,3}$ and the first direction vector $v_1(t)$.

The first BS may receive information indicating the first channel from the second base station. The first BS may receive information indicating the first channel from the third base station. The first BS may transmit a pilot signal to the second UE, and receive information indicating the second channel from the third base station, the second channel being based on the transmitted pilot signal. The first BS may transmit a pilot signal to the second UE, and receive information indicating the second channel from the second base station, the second channel being based on the transmitted pilot signal. The first BS may receive an uplink pilot signal from the first UE. The second channel may be determined based on the received uplink signal.

For example, referring to FIG. 7, the $BS_2$ may receive information indicating the first channel $H_{1,3}$ from the $BS_1$. The $BS_1$ may receive information indicating the first channel $H_{1,3}$ from the $BS_3$ and provide the received information to the $BS_2$. In TDD systems, the $BS_1$ may receive an uplink pilot signal from the $UE_3$, determine an uplink channel $H_{3,1}$ based on the received uplink pilot signal, and provide the uplink channel $H_{3,1}$ to the $BS_2$. The $BS_2$ may then assume that the channel $H_{1,3}=H_{3,1}$. The $BS_2$ may receive information indicating the first channel $H_{1,3}$ from the $BS_3$. The $BS_2$ may transmit a pilot signal to the $UE_2$, the $UE_3$ may receive the pilot signal, the $UE_3$ may send information indicating the second channel $H_{2,3}$ to the $BS_3$, and the $BS_2$ may receive information indicating the second channel $H_{2,3}$ from the $BS_3$. As such, the second channel $H_{2,3}$ is based on the transmitted pilot signal. The $BS_2$ may transmit a pilot signal to the $UE_2$, the $UE_3$ may receive the pilot signal, the $UE_3$ may determine the second channel $H_{2,3}$ based on the received pilot signal and send information indicating the second channel $H_{2,3}$ to either the $BS_1$ or the $BS_3$, the $BS_3$ may send information indicating the second channel $H_{2,3}$ to the $BS_1$ if the $BS_3$ receives the information indicating the second channel $H_{2,3}$ from the $UE_3$, and the $BS_2$ may receive information indicating the second channel $H_{2,3}$ from the $BS_1$. As such, the second channel $H_{2,3}$ is based on the transmitted pilot signal. In TDD systems, the $BS_2$ may receive an uplink pilot signal from the $UE_3$. The $BS_2$ may determine the uplink channel $H_{3,2}$ based on the received uplink pilot signal and assume the second channel $H_{2,3}=H_{3,2}$.

Referring again to FIG. 7, the $UE_3$ receives a first interfering signal $S_2$ from the $BS_2$ and a second interfering signal $S_1$ from the $BS_1$. The second interfering signal $S_1$ is associated with a first direction vector $v_1(t)$. The first interfering signal $S_2$ is associated with a second direction vector $v_2(t)$ determined based on a first channel $H_{1,3}$ between the $BS_1$ and the $UE_3$, on a second channel $H_{2,3}$ between the $BS_2$ and the $UE_3$, and on the first direction vector $v_1(t)$. A product of the second channel $H_{2,3}$ and the second direction vector $v_2(t)$ approximately aligning with (i.e., is proportional to) a product of the first channel $H_{1,3}$ and the first direction vector $v_1(t)$. The $UE_3$ receives a data transmission $S_3$ from the $BS_3$ serving the $UE_3$. The $UE_3$ cancels, at least partially, the first interfering signal $S_2$ and the second interfering signal $S_1$ from the data transmission $S_3$ in order to decode the data transmission $S_3$. The $UE_3$ may receive a pilot signal from the $BS_1$, and determine the first channel $H_{1,3}$ based on the received pilot signal. The $UE_3$ may transmit first channel information indicating the first channel $H_{1,3}$ to the $BS_1$. The $BS_1$ may then provide the first channel information to the $BS_2$. The $UE_3$ may transmit first channel information indicating the first channel $H_{1,3}$ to the $BS_3$. The $BS_3$ may then provide the first channel information directly to the $BS_2$ or directly to the $BS_1$, which then provides the received first channel information to the $BS_2$. In TDD systems, the $UE_3$ may transmit an uplink pilot signal to the $BS_3$, the $BS_1$ may receive the uplink pilot signal, the $BS_1$ may determine the channel $H_{3,1}$ based on the received uplink pilot signal, the $BS_1$ may provide the determined channel $H_{3,1}$ to the $BS_2$, and the $BS_2$ may determine the first channel $H_{1,3}$ based on the uplink pilot signal by assuming $H_{1,3}=H_{3,1}$. The $UE_3$ may receive a pilot signal from the $BS_2$, and determine the second channel $H_{2,3}$ based on the pilot signal. The $UE_3$ may transmit second channel information indicating the second channel $H_{2,3}$ to the $BS_1$, which then provides the received second channel information to the $BS_2$. The $UE_3$ may transmit second channel information indicating the second channel $H_{2,3}$ to the $BS_3$, which may then provide the second channel information directly to the $BS_2$ or directly to the $BS_1$, which then provides the received second channel information to the $BS_2$. In TDD systems, the $UE_3$ may transmit an uplink signal to the $BS_3$, the $BS_2$ may receive the uplink signal, the $BS_2$ may determine the channel $H_{3,2}$, and the $BS_2$ may determine the second channel $H_{2,3}$ based on the uplink signal by assuming $H_{2,3}=H_{3,2}$.

Figure 12:
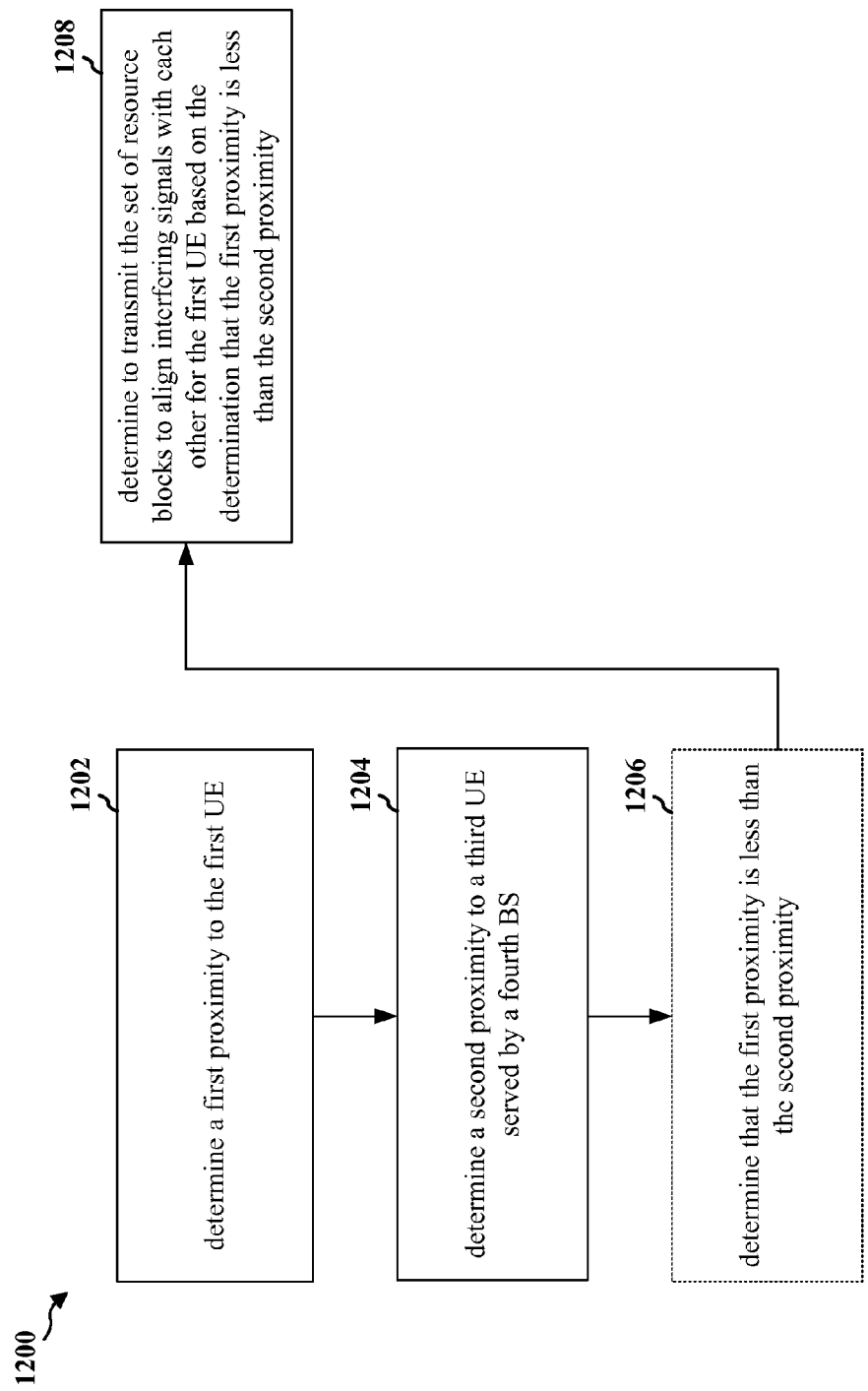
FIG. 12 is a flow chart of a second method of wireless communication.

FIG. 12 is a flow chart 1200 of a second method of wireless communication. The method may be performed by a base station, such as the femto base station $BS_2$ or the femto base station $BS_3$. In step 1202, a first BS determines a first proximity to the first UE. In step 1204, the first BS determines a second proximity to a third UE served by a fourth base station. In step 1206, the first BS determines that the first proximity is less than the second proximity and therefore that the first BS is closer to the first UE than the third UE. In step 1208, the first BS determines to transmit the set of resource blocks (using frequency dimensions and/or antenna dimensions) to align interfering signals with each other for the first UE based on the determination that the first proximity is less than the second proximity. If the first BS determines that the second proximity is less than the first proximity, then the first BS may determine instead to transmit the set of resource blocks (using frequency dimensions and/or antenna dimensions) to align interfering signals with each other for the third UE.

For example, referring to FIG. 7, the $BS_2$ determines a first proximity to the $UE_3$. In step 1204, the $BS_2$ determines a second proximity to the $UE_4$ served by the $BS_4$. In step 1206, the $BS_2$ determines that the first proximity is less than the second proximity and therefore that the $BS_2$ is closer to the $UE_3$ than the $UE_4$. In step 1208, the $BS_2$ determines to transmit the set of resource blocks (using frequency dimensions and/or antenna dimensions) to align interfering signals with each other for the $UE_3$ based on the determination that the first proximity is less than the second proximity. If the $BS_2$ determines that the second proximity is less than the first proximity, then the $BS_2$ may determine instead to transmit the set of resource blocks (using frequency dimensions and/or antenna dimensions) to align interfering signals with each other for the $UE_4$. If the $BS_2$ determines to align interfering signals for the $UE_3$, the $BS_2$ uses Eq. (1) to determine the direction vector $v_2(t)$. If the $BS_2$ determines to align interfering signals for the $UE_4$, the $BS_2$ determines $v_2(t)$ by the relationship $v_2(t) \propto v_1(t) H_{1,4}(H_{2,4})^{-1}$, where $H_{1,4}$ is the channel between the $BS_1$ and the $UE_4$ and $H_{2,4}$ is the channel between the $BS_2$ and the $UE_4$.

Figure 13:
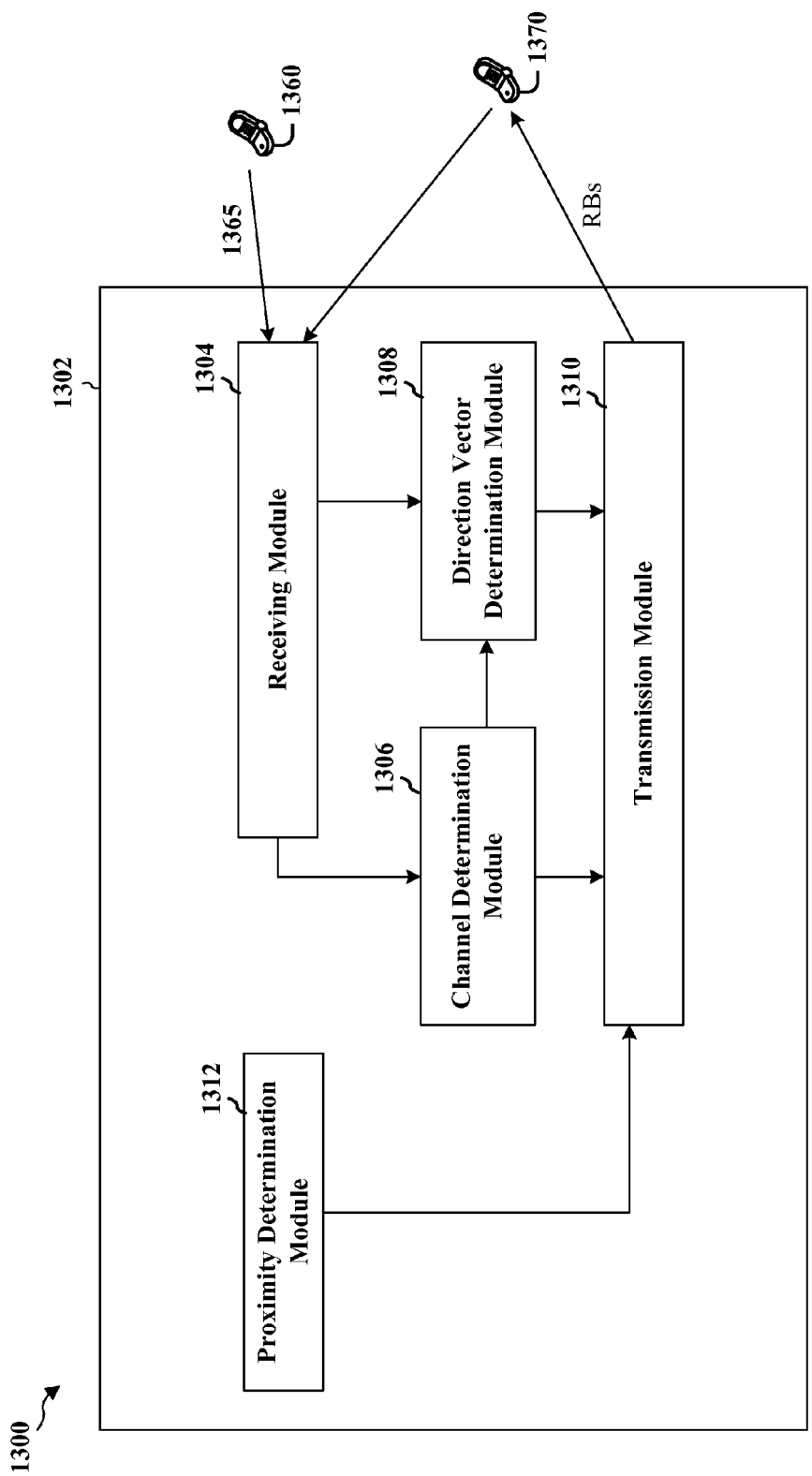
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a base station, such as the femto base station $BS_2$ or the femto base station $BS_3$. The apparatus 1302, which is a first base station, may include one or more of a receiving module 1304, a channel determination module 1306, a direction vector determination module 1308, a transmission module 1310, and a proximity determination module 1312. The channel determination module 1306 is configured to determine a first channel between a second base station and a first UE 1360 served by a third base station. The channel determination module 1306 is further configured to determine a second channel between the first base station and the first UE 1360. The direction vector determination module 1308 is configured to determine a first direction vector to be used by the second base station for sending a data transmission. The transmission module 1310 is configured to transmit a set of resource blocks to a second UE 1370 served by the first base station with a second direction vector determined based on the first channel, the second channel, and the first direction vector to be used by the second base station. The direction vector determination module 1308 may be further configured to determine the second direction vector such that a product of the second channel and the second direction vector approximately aligns with a product of the first channel and the first direction vector. The receiving module 1304 may be configured to receive information indicating the first channel from the second base station. The receiving module 1304 may be further configured to receive information indicating the first channel from the third base station. The transmission module 1310 may be configured to transmit a pilot signal to the second UE 1370, and the receiving module 1304 may be configured to receive information indicating the second channel from the third base station. The second channel may be based on the transmitted pilot signal. The transmission module 1310 may be configured to transmit a pilot signal to the second UE 1370, and the receiving module 1304 may be configured to receive information indicating the second channel from the second base station, the second channel being based on the transmitted pilot signal. The receiving module 1304 may be configured to receive an uplink pilot signal 1365 from the first UE 1360. The second channel may be determined based on the received uplink signal. The proximity determination module may be configured to determine a first proximity to the first UE 1360, to determine a second proximity to a third UE served by a fourth base station, to determine that the first proximity is less than the second proximity, and to determine to transmit the set of resource blocks to align interfering signals with each other for the first UE 1360 based on the determination that the first proximity is less than the second proximity. The receiving module 1304 may be configured to receive information indicating direction vectors to be used in sequence by the second base station. The direction vectors include the first direction vector.

The apparatus may include additional modules that perform each of the steps of the algorithm in the aforementioned flow charts of FIG. 11 and FIG. 12. As such, each step in the aforementioned flow charts of FIG. 11 and FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
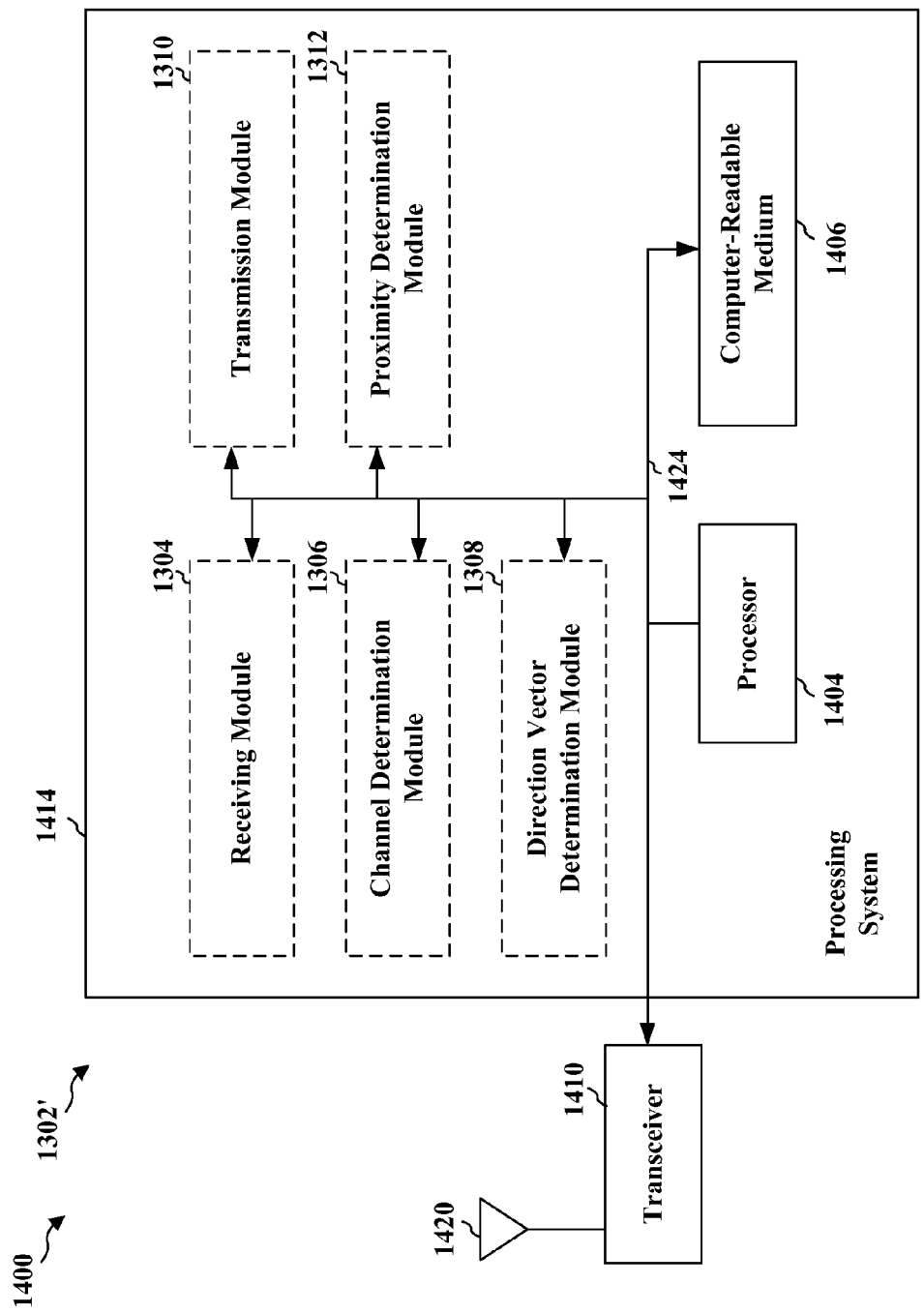
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312 and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1304. In addition, the transceiver 1410 receives information from the processing system 1414, specifically the transmission module 1310, and based on the received information, generates a signal to be applied to the one or more antennas 1420. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, and 1312. The modules may be software modules running in the processor 1404, resident/stored in the computer readable medium 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1302/1302' for wireless communication is a first base station and includes means for determining a first channel between a second base station and a first UE served by a third base station, means for determining a second channel between the first base station and the first UE, and means for determining a first direction vector to be used by the second base station for sending a data transmission. Apparatus further include means for transmitting a set of resource blocks to a second UE served by the first base station with a second direction vector determined based on the first channel, the second channel, and the first direction vector to be used by the second base station. The apparatus may further include means for determining the second direction vector such that a product of the second channel and the second direction vector approximately aligns with a product of the first channel and the first direction vector. The apparatus may further include means for receiving information indicating the first channel from the second base station. The apparatus may further include means for receiving information indicating the first channel from the third base station. The apparatus may further include means for transmitting a pilot signal to the second UE, and means for receiving information indicating the second channel from the third base station, the second channel being based on the transmitted pilot signal. The apparatus may further include means for transmitting a pilot signal to the second UE, and means for receiving information indicating the second channel from the second base station, the second channel being based on the transmitted pilot signal. The apparatus may further include means for receiving an uplink pilot signal from the first UE. The second channel may be determined based on the received uplink signal. The apparatus may further include means for determining a first proximity to the first UE, means for determining a second proximity to a third UE served by a fourth base station, means for determining that the first proximity is less than the second proximity, and means for determining to transmit the set of resource blocks to align interfering signals with each other for the first UE based on the determination that the first proximity is less than the second proximity. The apparatus may further include means for receiving information indicating direction vectors to be used in sequence by the second base station, the direction vectors including the first direction vector.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first base station, comprising:
   determining a first channel between a second base station and a first user equipment (UE) served by a third base station;
   determining a second channel between the first base station and the first UE;
   determining a first direction vector to be used by the second base station for sending a data transmission; and
   transmitting a set of resource blocks to a second UE served by the first base station with a second direction vector determined based on the first channel, the second channel, and the first direction vector to be used by the second base station.

2. The method of claim 1, further comprising determining the second direction vector, wherein the second direction vector is determined such that a product of the second channel and the second direction vector approximately aligns with a product of the first channel and the first direction vector.

3. The method of claim 1, further comprising receiving information indicating the first channel from the second base station.

4. The method of claim 1, further comprising receiving information indicating the first channel from the third base station.

5. The method of claim 1, further comprising:
   transmitting a pilot signal to the second UE; and
   receiving information indicating the second channel from the third base station, the second channel being based on the transmitted pilot signal.

6. The method of claim 1, further comprising:
   transmitting a pilot signal to the second UE; and
   receiving information indicating the second channel from the second base station, the second channel being based on the transmitted pilot signal.

7. The method of claim 1, further comprising receiving an uplink pilot signal from the first UE, wherein the second channel is determined based on the received uplink signal.

8. The method of claim 1, further comprising:
   determining a first proximity to the first UE; and
   determining a second proximity to a third UE served by a fourth base station;
   determining that the first proximity is less than the second proximity; and
   determining to transmit the set of resource blocks to align interfering signals with each other for the first UE based on the determination that the first proximity is less than the second proximity.

9. The method of claim 1, further comprising receiving information indicating direction vectors to be used in sequence by the second base station, the direction vectors including the first direction vector.

10. An apparatus for wireless communication, the apparatus being a first base station comprising:
    means for determining a first channel between a second base station and a first user equipment (UE) served by a third base station;
    means for determining a second channel between the first base station and the first UE;
    means for determining a first direction vector to be used by the second base station for sending a data transmission; and
    means for transmitting a set of resource blocks to a second UE served by the first base station with a second direction vector determined based on the first channel, the second channel, and the first direction vector to be used by the second base station.

11. The apparatus of claim 10, further comprising means for determining the second direction vector, wherein the second direction vector is determined such that a product of the second channel and the second direction vector approximately aligns with a product of the first channel and the first direction vector.

12. The apparatus of claim 10, further comprising means for receiving information indicating the first channel from the second base station.

13. The apparatus of claim 10, further comprising means for receiving information indicating the first channel from the third base station.

14. The apparatus of claim 10, further comprising:
    means for transmitting a pilot signal to the second UE; and
    means for receiving information indicating the second channel from the third base station, the second channel being based on the transmitted pilot signal.

15. The apparatus of claim 10, further comprising:
    means for transmitting a pilot signal to the second UE; and
    means for receiving information indicating the second channel from the second base station, the second channel being based on the transmitted pilot signal.

16. The apparatus of claim 10, further comprising means for receiving an uplink pilot signal from the first UE, wherein the second channel is determined based on the received uplink signal.

17. The apparatus of claim 10, further comprising:
    means for determining a first proximity to the first UE; and
    means for determining a second proximity to a third UE served by a fourth base station;
    means for determining that the first proximity is less than the second proximity; and
    means for determining to transmit the set of resource blocks to align interfering signals with each other for the first UE based on the determination that the first proximity is less than the second proximity.

18. The apparatus of claim 10, further comprising means for receiving information indicating direction vectors to be used in sequence by the second base station, the direction vectors including the first direction vector.

19. An apparatus for wireless communication, the apparatus being a first base station comprising:
a processing system configured to:
determine a first channel between a second base station and a first user equipment (UE) served by a third base station;
determine a second channel between the first base station and the first UE;
determine a first direction vector to be used by the second base station for sending a data transmission; and
transmit a set of resource blocks to a second UE served by the first base station with a second direction vector determined based on the first channel, the second channel, and the first direction vector to be used by the second base station.

20. The apparatus of claim 19, wherein the processing system is further configured to determine the second direction vector, wherein the second direction vector is determined such that a product of the second channel and the second direction vector approximately aligns with a product of the first channel and the first direction vector.

21. The apparatus of claim 19, wherein the processing system is further configured to receive information indicating the first channel from the second base station.

22. The apparatus of claim 19, wherein the processing system is further configured to receive information indicating the first channel from the third base station.

23. The apparatus of claim 19, wherein the processing system is further configured to:
transmit a pilot signal to the second UE; and
receive information indicating the second channel from the third base station, the second channel being based on the transmitted pilot signal.

24. The apparatus of claim 19, wherein the processing system is further configured to:
transmit a pilot signal to the second UE; and
receive information indicating the second channel from the second base station, the second channel being based on the transmitted pilot signal.

25. The apparatus of claim 19, wherein the processing system is further configured to receive an uplink pilot signal from the first UE, wherein the second channel is determined based on the received uplink signal.

26. The apparatus of claim 19, wherein the processing system is further configured to:
determine a first proximity to the first UE; and
determine a second proximity to a third UE served by a fourth base station;
determine that the first proximity is less than the second proximity; and
determine to transmit the set of resource blocks to align interfering signals with each other for the first UE based on the determination that the first proximity is less than the second proximity.

27. The apparatus of claim 19, wherein the processing system is further configured to receive information indicating direction vectors to be used in sequence by the second base station, the direction vectors including the first direction vector.

28. A computer program product in a first base station, comprising:
a non-transitory computer-readable medium comprising code for:
determining a first channel between a second base station and a first user equipment (UE) served by a third base station;
determining a second channel between the first base station and the first UE;
determining a first direction vector to be used by the second base station for sending a data transmission; and
transmitting a set of resource blocks to a second UE served by the first base station with a second direction vector determined based on the first channel, the second channel, and the first direction vector to be used by the second base station.

29. The computer program product of claim 28, wherein the non-transitory computer-readable medium further comprises code for determining the second direction vector, wherein the second direction vector is determined such that a product of the second channel and the second direction vector approximately aligns with a product of the first channel and the first direction vector.

30. The computer program product of claim 28, wherein the non-transitory computer-readable medium further comprises code for receiving information indicating the first channel from the second base station.

31. The computer program product of claim 28, wherein the non-transitory computer-readable medium further comprises code for receiving information indicating the first channel from the third base station.

32. The computer program product of claim 28, wherein the non-transitory computer-readable medium further comprises code for:
transmitting a pilot signal to the second UE; and
receiving information indicating the second channel from the third base station, the second channel being based on the transmitted pilot signal.

33. The computer program product of claim 28, wherein the non-transitory computer-readable medium further comprises code for:
transmitting a pilot signal to the second UE; and
receiving information indicating the second channel from the second base station, the second channel being based on the transmitted pilot signal.

34. The computer program product of claim 28, wherein the non-transitory computer-readable medium further comprises code for receiving an uplink pilot signal from the first UE, wherein the second channel is determined based on the received uplink signal.

35. The computer program product of claim 28, wherein the non-transitory computer-readable medium further comprises code for:
determining a first proximity to the first UE; and
determining a second proximity to a third UE served by a fourth base station;
determining that the first proximity is less than the second proximity; and
determining to transmit the set of resource blocks to align interfering signals with each other for the first UE based on the determination that the first proximity is less than the second proximity.

36. The computer program product of claim 28, wherein the non-transitory computer-readable medium further comprises code for receiving information indicating direction vectors to be used in sequence by the second base station, the direction vectors including the first direction vector.

* * * * *